No. 658,454. Patented Sept. 25, 1900.
J. E. MOORE.
FARM GATE.
(Application filed June 9, 1900.)
(No Model.) 2 Sheets—Sheet 1.
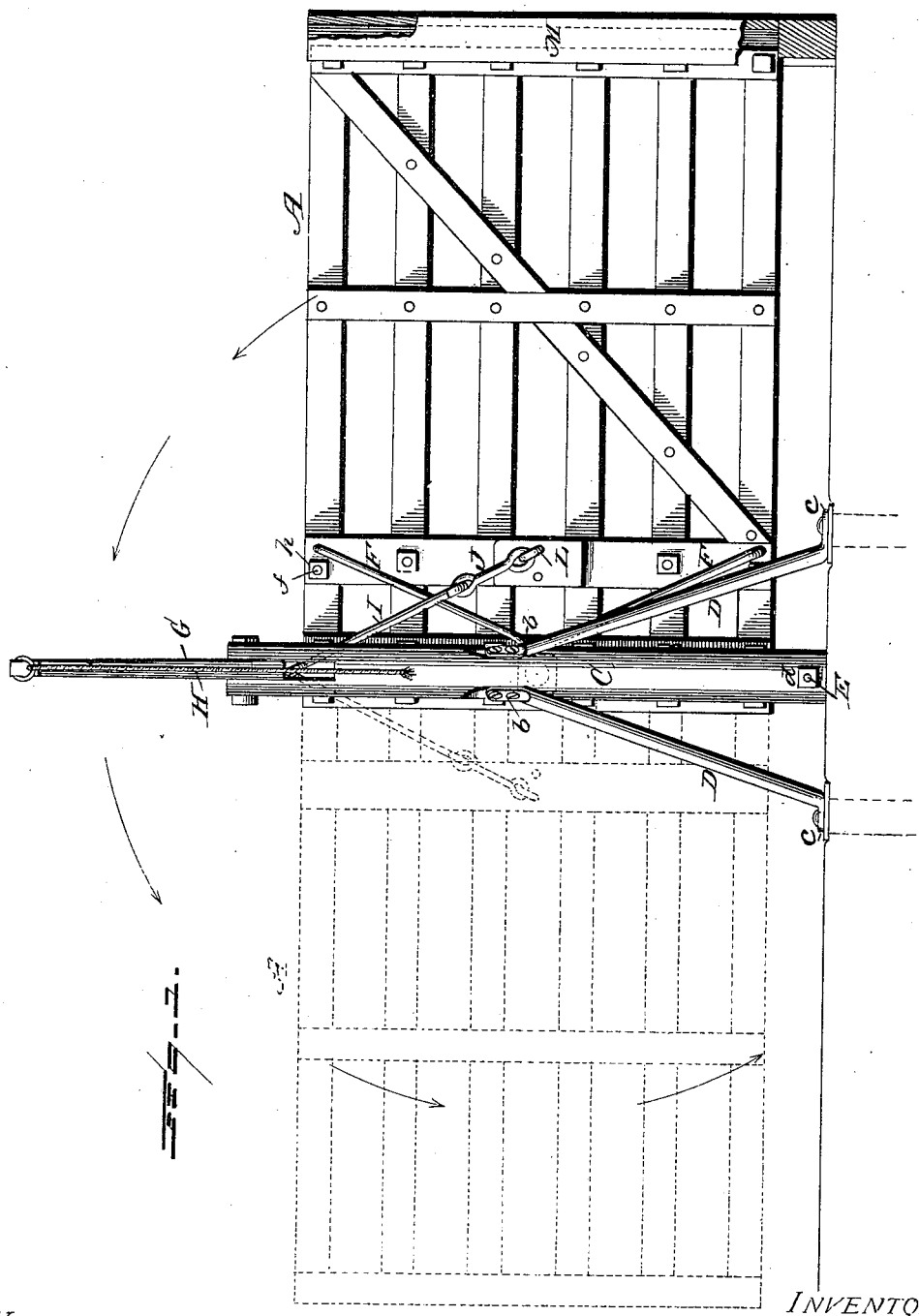
WITNESSES:
L. C. Hills
Karl H. Butler
INVENTOR:
James E. Moore,
BY Chas. H. Fowler
Attorney No. 658,454. Patented Sept. 25, 1900.
J. E. MOORE.
FARM GATE.
(Application filed June 9, 1900.)
(No Model.)
2 Sheets—Sheet 2.
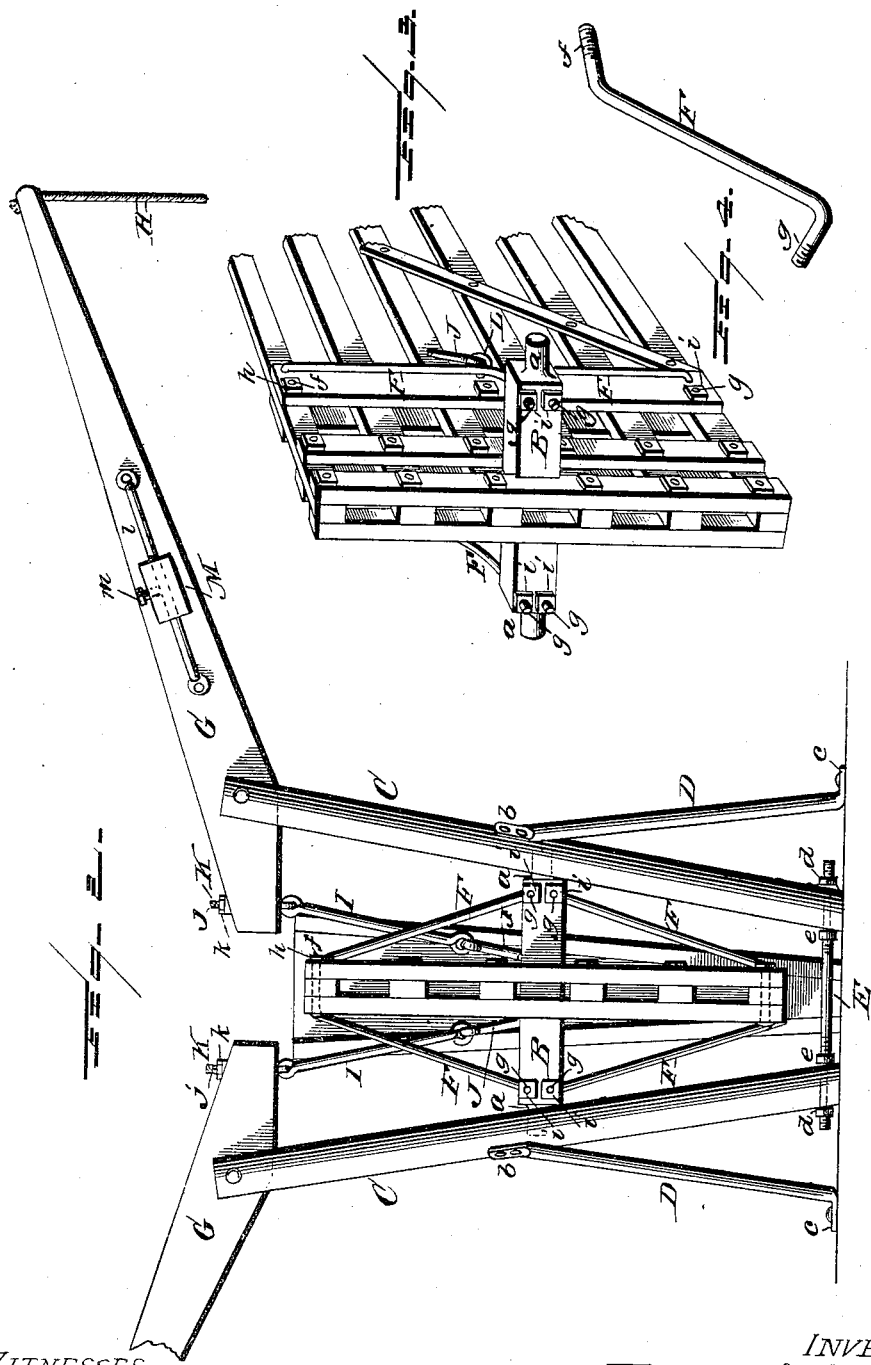
WITNESSES:
L. C. Hills
Karl H. Butler
INVENTOR:
James E. Moore
BY Chas. H. Fowler,
Attorney

UNITED STATES PATENT OFFICE.

JAMES E. MOORE, OF BOZEMAN, MONTANA.

FARM-GATE.

SPECIFICATION forming part of Letters Patent No. 658,454, dated September 25, 1900.

Application filed June 9, 1900. Serial No. 19,745. (No model.)

*To all whom it may concern:*

Be it known that I, JAMES E. MOORE, a citizen of the United States, residing at Bozeman, in the county of Gallatin and State of Montana, have invented certain new and useful Improvements in Farm-Gates; and I do hereby declare that the following is a full, clear, and exact description of the same, reference being had to the annexed drawings, making a part of this specification, and to the letters of reference marked thereon.

The present invention has for its object to provide a farm-gate that will be simple in construction, easy of operation, and possess strength and durability; and it consists in a gate constructed substantially as shown in the drawings and hereinafter described and claimed.

Figure 1 of the drawings represents a farm-gate constructed substantially in accordance with my invention, showing a side elevation of the gate in full lines in its closed or normal position and in dotted lines in the position it will assume when the gate is open; Fig. 2, an end view thereof, showing one of the operating-levers partly broken away; Fig. 3, a detail perspective view of the inner or pivoted end of the gate; Fig. 4, a detail view in perspective of one of the angular brace-rods.

In the accompanying drawings, A represents the gate, which may be of any suitable construction and has connected thereto a short horizontal beam B, with pivot-pins $a$ at its extremities, which engage with pivot-holes in the upright posts C, said posts leaning in an outward direction at an angle to a perpendicular, as shown in Fig. 2 of the drawings.

The posts C are braced by stay-rods D, which are secured thereto at their upper ends, the same being flattened, as shown at $b$, for convenience in fastening the stay-rods to the posts. The lower ends of the rods have feet $c$ for convenience in securing them to stakes or other suitable objects inserted in the ground, said rods being disposed at an acute angle to the posts, as shown. The lower ends of the posts C are let into the ground a suitable distance, and immediately above the surface of the ground the posts are connected together by a horizontal rod E, which I term a "take-up" rod, its ends loosely passing through the posts and screw-threaded to receive tightening-nuts $d$ and nuts $e$. Should the stay-rods D become loose from any cause and the posts C begin to sag, by turning the nuts $d\,e$ in the proper direction the posts will be brought up to their former position for the necessary engagement of the pivot holes or sockets with the pivot-pins $a$ to insure a proper suspension of the gate and its perfect operation.

The gate A and the short horizontal beam B are braced together by a peculiar arrangement of brace-rods F, the particular form of said rods being shown in detail in Fig. 4 of the drawings. These rods have screw-threaded shanks $f\,g$, which are disposed at right angles to each other and extend, respectively, through the rear end of the gate A and through the ends of the beam B, there being four of these brace-rods arranged in pairs above and below the horizontal beam, as shown in Fig. 2 of the drawings. The screw-threaded shanks of the brace-rods F extend horizontally through the gate and the horizontal beam and are secured thereto by nuts $h\,i$, engaging, respectively, the shanks $f g$, whereby the brace-rods are firmly secured in place to form a rigid metal strengthening-frame to the gate, as well as to connect the gate and horizontal beam together.

The pivoted gate A is operated by levers G, pivotally connected to the upper ends of the posts C and at their outer ends having chains or cords H for operating the levers, or any other suitable and well-known means may be employed for tilting or operating the gate, as found most desirable. These levers may be of any suitable form and length and are connected to the gate near its inner end and on the same horizontal plane with the beam B by means of the double links I J. The links I are connected at their upper ends to an eye-rod K, which rod extends up through the lever G and has a screw-threaded shank $j$, with which engages the nut $k$, thereby enabling the eye-rod to be adjusted to increase or diminish the distance between the inner end of the lever and the point of connection of the link J with the eye-rods. The gate being suspended, as herein shown and described, secures a perfect balancing of the gate, and when raised to a position to overcome the center of gravity the gate will descend upon the opposite side of the gate-post C and assume a horizontal position, as indicated in dotted lines of Fig. 1 of the drawings. The usual flanged post holds the gate in its closed position, as indicated in full lines of Fig. 1 of the drawings.

I do not wish to be understood as limiting myself to any special form or construction of gate-post, as any of the usual forms may be substituted and used either with or without a latch, as found most desirable.

The gate, with its operating parts, may be variously modified or changed in the several details of construction, such as would come within ordinary mechanical skill, without departing from the principle of the invention, such changes being left to the manufacturer or builder of the gate and as may be suggested by the purchaser or others interested therein.

The levers G have connected thereto in any suitable manner a counterpoise adjustable weight M, so as to keep the gate properly balanced. This weight M is adjustable upon a guide-rod $l$, said weight being held in its adjusted position by a set-screw $m$, or any suitable means may be employed for adjustably connecting the weight to the lever, as found preferable.

Having now fully described my invention, what I claim as new, and desire to secure by Letters Patent, is—

A tilting gate having a horizontal beam connected thereto at or near its center, diagonal brace-rods having screw-threaded shanks which are disposed at right angles to each other and extend respectively through the rear end of the gate and through the ends of the beam, nuts engaging the screw-threaded ends of the rods, and pivoted levers connecting with the gate for operating it, substantially as and for the purpose described.

In testimony that I claim the above I have hereunto subscribed my name in the presence of two witnesses.

JAMES E. MOORE.

Witnesses:
GEO. W. ELLIS,
E. R. HALL.